Dec. 17, 1968         F. X. MAIDA         3,416,207
METHOD OF MANUFACTURING A CAPACITOR
Filed Oct. 22, 1965         2 Sheets-Sheet 1
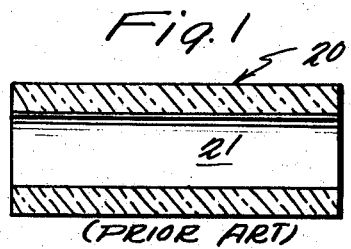
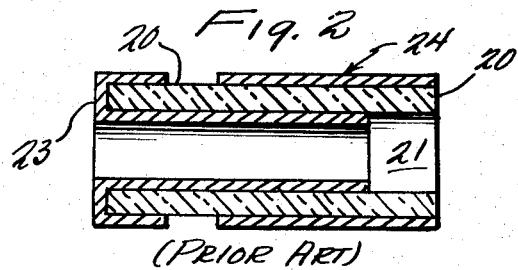
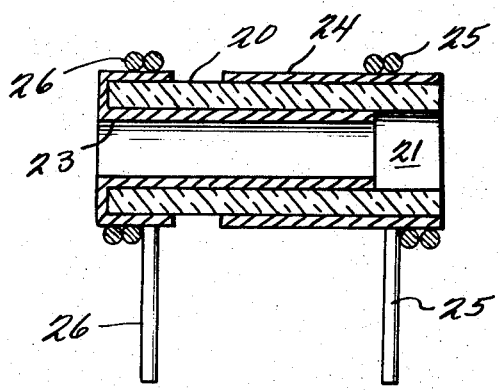
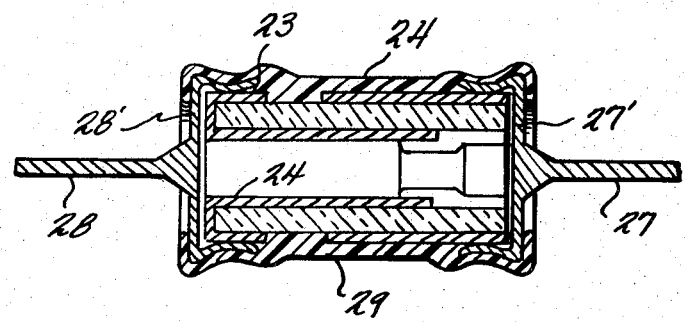
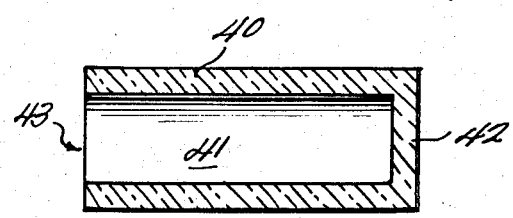
INVENTOR
FRANCIS X. MAIDA
BY
*Cushman, Darby & Cushman*
ATTORNEYS Dec. 17, 1968  F. X. MAIDA  3,416,207
METHOD OF MANUFACTURING A CAPACITOR
Filed Oct. 22, 1965  2 Sheets-Sheet 2
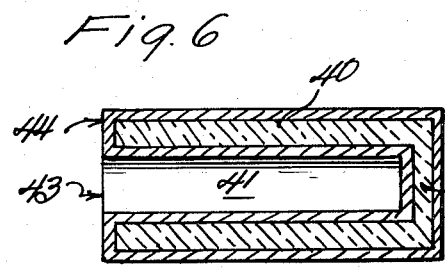
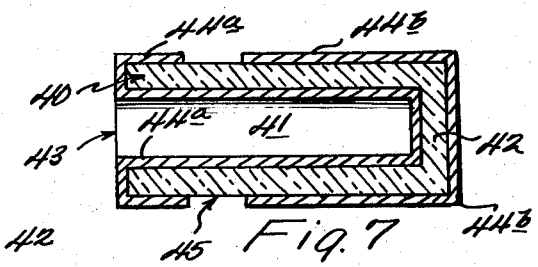
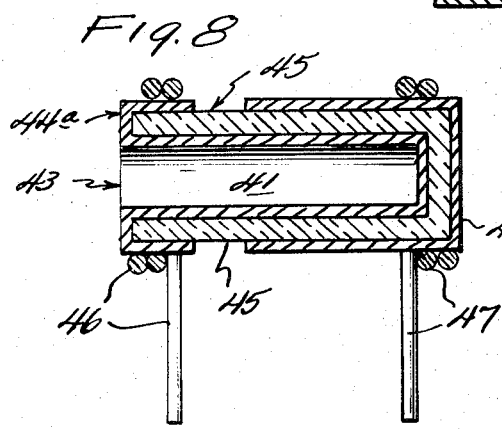
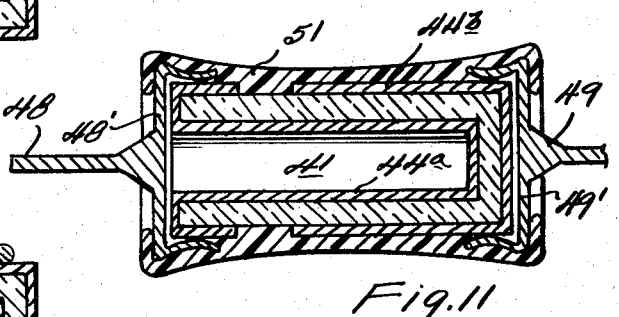
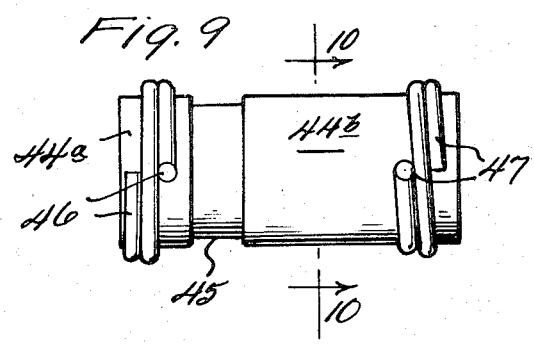
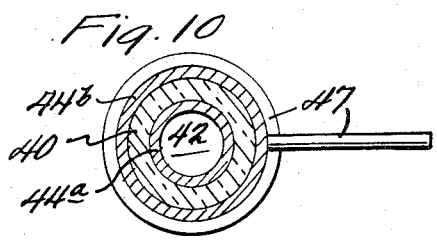
INVENTOR
FRANCIS X. MAIDA
BY Cushman, Darby & Cushman
ATTORNEYS United States Patent Office
3,416,207
Patented Dec. 17, 1968

3,416,207
METHOD OF MANUFACTURING A CAPACITOR
Francis X. Maida, Hampton, Va., assignor to Maida Development Company, Hampton, Va., a corporation of New Jersey
Filed Oct. 22, 1965, Ser. No. 501,547
7 Claims. (Cl. 29—25.42)

This invention relates to a novel process for the production of capacitors, and to the resultant article. The invention is primarily concerned with capacitors having a tubular configuration.

As is known, a capacitor or condenser is an electrical device that has the ability to store a small quantity of electrical energy, and the amount of energy a particular capacitor is able to store is termed its capacity. A typical capacitor consists of two electrically conductive plates or electrodes separated by a non-conducting medium termed the dielectric. The plates may be of any shape, and together wtih the dielectric, the whole assembly may assume any convenient configuration so long as the two plates are separated by the dielectric. The dielectric may be a ceramic material and the plates may be formed by film-like coatings of conductive metal upon the surface of the ceramic material. Wire leads are affixed to the metal deposits which serve to make electrical connection to the capacitor.

The tubular capacitor has the advantage of compact size, since the conductive coatings may be deposited on both the inside and the outside surfaces. Also, tubular capacitors are well adapted to precise control of the capacitance. The connecting leads attached to tubular capacitors may be of two types, either those extending axially from each end of the tube, or those leads which extend radially from a point near each end of the tube.

The capacity is determined by a number of factors, including the composition of the dielectric, which is a matter of selection according to the invention. Important capacity determinative factors according to the invention are the area of the plates or electrodes and the distance they are separated, the size and the closeness of separation being directly proportional to the capacity.

Usually, the electrodes and all exposed areas of the dielectric are covered with a protective coating of an insulating or non-conductive material. This is done for reasons of reliability and adaptability to various applications, rather than as a means for controlling the capacity. Typically, the capacitor assembly is insulated by a coating of enamel or a durable resin of the epoxy or phenolic type, such a "Durez" resin of the Hooker Company.

It has been found that presently known tubular capacitors are objectionable in the complex method of applying the electrode coatings. Usually, one electrode is applied as a metal coating to the inside surface of the tubular dielectric, followed by heating in a furnace to promote bonding of the coating to the dielectric. The second electrode is then applied as a metal coating to the outside surface of the dielectric, again followed by heating to bond this coating to the dielectric. The relative size of each of the electrode coatings can be controlled by one or more masking steps, or by precision in the coating operation. Each of the coating operations, and each masking operation, should be controlled within precise limits to arrive at the intended capacity. This clearly involves unnecessary duplication in the precision operations and it will be recognized that such prior art procedures are objectionable if great precision is desired, at relatively low cost.

It is therefore an object of this invention to overcome the defects of prior art procedures, and provide an improved method of making a tubular capacitor. It is a more specific object of this invention to provide an improved method for fabricating capacitors with precision control on the ultimate capacity. It is another object of the invention to provide a new method for controlling the capacity of a condenser or a capacitor within precise limits. It is a further object of the invention to provide an improved tubular capacitor.

Other and further objects of the invention, as well as an appreciation for the advantages and improvements that the present invention offers over the prior art procedures, will become increasingly apparent herein.

The improvements according to the invention are largely realized through the use of a blind hole dielectric tube and a single step coating operation to provide a bubble free conductive coating. This is coupled with a grinding operation which is used to define the ultimate capacity. Any number of different capacities may be arrived at, using the same coating operation. Moreover, there is only one "precision" operation, and this is in the grinding step, permitting greater ease of control in the coating operation.

In this application, the term "insulator" is used to denote a dielectric or non-conducting material, and an area on the surface of a dielectric that separates the plates or electrodes will be termed an "insulating band." In the case of tubular capacitors according to the invention, using ceramic dielectrics having a tubular shape, the arrangement of the electrodes deposited on the dielectric tube and the size of the insulating bands control the amount of capacity a particular capacitor is to have.

Reference should now be had to the accompanying drawings wherein a comparison is made with prior art procedures as best facilitating the understanding of this invention and the advantages offered thereby. In the drawings, a section has been taken along the longitudinal axis of the various dielectrics and capacitors, as best showing the areas covered by the conductive coating, relative to the insulating bands. Also depicted are various methods for affixing the connecting leads.

In the drawings:

FIGURE 1 is a cross sectional side elevation of a tubular ceramic insulating member utilized in producing capacitors according to the prior art;

FIGURE 2 is a view of the ceramic member of FIGURE 1 following the usual prior art masking and plating steps;

FIGURE 3 is a view of the plated ceramic member of FIGURE 2, following the attachment of radial wire leads;

FIGURE 4 is a cross sectional side elevation of a typical modification according to the prior art having axial wire leads and showing the usual insulating coating applied over the capacitor body;

FIGURE 5 is a cross sectional side elevation of a suitable blind hole ceramic insulating member that is utilized in making a capacitor according to the present invention;

FIGURE 6 is a view of the blind hole ceramic element of FIGURE 5 following the coating or plating step;

FIGURE 7 is a view of the plated ceramic element of FIGURE 6 following the grinding operation according to the present invention;

FIGURE 8 is a view of the plated and ground ceramic element of FIGURE 7 following attachment of radial wire leads;

FIGURE 9 is a bottom plan view, not in cross section, of the device in FIGURE 8;

FIGURE 10 is a cross sectional end view of this device taken along lines 10—10 in FIGURE 9;

FIGURE 11 is a cross sectional side elevation of an alternative embodiment according to the invention, utilizing axial wire leads and showing an outside insulating coating applied thereover; and FIGURE 12 is a flow diagram illustrating the method according to the invention.

FIGURES 1 to 4 illustrate prior art practice. In FIGURE 1, the typical ceramic insulating member utilized according to prior art methods of producing tubular capacitors has a tubular ceramic body 20 provided with a continuous opening or throughbore 21. The prior art arrangement of the electrodes is shown in FIGURE 2, wherein the ceramic member 20 is shown with first and second electrodes 23 and 24 following the usual plural prior art plating and any masking steps.

These electrodes are usually formed by depositing a plating solution onto the surface of the dielectric, in this case the ceramic tube 20, following by exposing the coated tube to a high temperature. Fluxes in the solution bond the electrode material, for example silver, to the ceramic to form a metal plate or electrode about the surface of the tubular dielectric. In the silver application operation, the inside electrode 23 is first applied and then bonded in a furnace. Next, the outside electrode 24 is applied and again the capacitor is sent through the bonding furnace. The capacity may be obtained by precision coating control to adjust the length of the silver deposit 23 inside the tube and also the distance along the outside of the tube occupied by the other electrode 24, thus adjusting the area of the plates. The two coating operations can also be carried out by covering a portion of the outside ceramic body with a masking coating, and plugging up part of the throughbore 21, after which the ceramic body 20 can be immersed in a suitable plating bath for application of the coating 23. The coating 23 is then heated, if necessary, followed by removal of the masking coatings. Thereafter, the coating 23 can be covered with a masking coating after which the ceramic member is immersed in the plating bath for application of the coating 24. Thereafter, the masking coatings are again removed followed by the bonding treatment, after which wire leads 25 and 26 may be applied, as shown in FIGURE 3.

FIGURE 3 shows the prior art ceramic capacitor tube fitted with a pair of radial leads which are joined to the silver electrodes by dipping in solder. It will be noted that radial wire lead 25 is connected to the coating 24, while radial lead 26 is connected to the coating 23. Typically, these coatings average .001 to .005 mm. in thickness. After connection of the leads, the capacitor is then given an insulating coating. In the case of the radial lead configuration the coating is either enamel or a "Durez" resin. When coated with enamel, both the inside and outside "insulating bands" are protected by this coating, and wax impregnant also fills the inside cavity to protect the inside insulating band. The "Durez" resin wil not fill the inside cavity of tube as enamel will, due to the higher viscosity of the resin material.

FIGURE 4 shows the construction of a prior art axial lead type tubular capacitor. The prior art construction, with the electrode coatings 23 and 24, may be provided with axial lead members 27 and 28. Thereafter, an insulating coating of a suitable varnish, epoxy resin or the like may be applied, as at 29. The same ceramic tube 20 and electrode arrangement are used as in the radial lead configuration. However, before the axial lead caps 27' and 28' are forced upon the ends of the tube to make connection to the respective electrodes, a coating must be applied to the inside of the tube to protect the inside insulating band, for once the leads are in place, no impregnant would reach the inside cavity. The outside insulating band is protected, as well as the electrodes, by a coating of epoxy resin. This epoxy resin also serves to secure the lead caps 27' and 28' in place.

Although the electrode in the FIGURE 4 configuration is exposed inside the tubular capacitor, no harm will result as there can be no contact with any foreign conducting objects, and the nature of the electrode is such that it will resist corrosion. This method, with slight variations, is in current use in assembling ceramic dielectric capacitors upon a dielectric having the shape of a tube.

In complete contrast with the prior art, it has now been discovered that the plural coating and/or masking steps may be obviated according to the invention, by first using a blind hole ceramic member, such as the member 40 shown in FIGURE 5, having an interior opening 41 of about 1.5 mm. diameter that is closed at one end 42 and open at the other end 43. The tube is formed so that the center hole does not extend completely through, thus the shape can be roughly compared to a cylindrical cup. While a cup-shaped member is illustrated, it will be understood that other ceramic shapes may be employed so long as the concept of the invention is observed.

The first step in forming an electrode according to the invention is to deposit by chemical means, a coating of copper, copper with nickel plating, or other intended metal or metals over the entire surface of the ceramic. If desired, the metal could be deposited by applying a silver solution over the ceramic and bonding this in a furnace. These metals are mentioned specifically, but any method of metalizing the entire surface of the ceramic may be used.

During the plating process, bubbles will form inside the tube 40. According to the invention means in the art are used to apply a vacuum above the surface of plating solution periodically, and periodically return to atmospheric pressure. This will cause these bubbles to escape, thereby permitting complete coating of all ceramic surfaces. Vacuum conditions or pressures as low as 2.5 p.s.i.a., and atmospheric pressures as high as 15.8 p.s.i.a. are preferably employed, although pressures between 5 to 14 p.s.i.a. may also be employed. This procedure is an important advance in this art, for it is difficult to deposit a metal inside a small cavity without some means of extracting the bubbles which otherwise would prevent the contact of the solution with the ceramic.

FIGURE 6 illustrates the intermediate product according to the invention after the entire blind hole member 40 has been immersed in a plating bath (not shown) so that all surfaces are coated. The surface of the plating bath, using means known in the art is periodically subjected to vacuum and pressure conditions, so that bubbles are eliminated and the plating bath completely covers all exposed surfaces of the blind hole ceramic member 40. The preferred frequency or period of pressure application is one cycle per 10 minutes, although other frequencies may also be found suitable. This process may also be combined with other known treatments, for example, the treatment according to the process of Stanley H. Thompson patent, No. 3,034,921 dated May 15, 1962.

Following the plating step, and any heating or drying steps that may be necessary, it has been found according to the present invention that a portion of the plating 44 can be completely ground away, to leave an insulating band of exposed dielectric in the area 45 in FIGURE 7. It will be understood that the ground area 45 passes completely around the outside surface (or the inside surface, if desired) of the blind hole ceramic member 40 so that the plating 44 will be completely divided into two separate portions 44a and 44b, which define two separate electrodes.

Preferably, the insulation band is ground on the outside of the tube using an abrasive wheel. By grinding into the ceramic a small distance, the metal deposit is removed and the insulation band is formed. With this one band, it can be seen from FIGURE 7 that there are two electrodes separated by the necessary dielectric. The area of the electrodes and their positions with respect to each other can be controlled by the position of the insulation band and also by the width of the band. It will be understood that virtually any capacity, subject to the limitations of the particular tube, may be obtained during the grinding operation.

As shown in FIGURE 8, the usual radial wire leads 46 and 47 may be attached to the separate electrodes 44a and 44b. In this case, radial lead wires 46 are attached to the "inside" electrode 44a while radial lead wires 47 are attached to the "outside" electrodes 44b. The positioning of the radial lead wires and the circumferential shape of the ground area 45 will be better understood with reference to FIGURES 9 and 10. The exact positioning is not essential to the success of this invention, but may be subject to variation by those skilled in the art. A coating of enamel or a "Durez" resin may be used to protect the insulation band and the outside electrodes. With the open end sealed by the coating and nothing present inside the cavity but the inside electrode, penetration of the coating is of no concern.

FIGURE 11 shows the same tube assembled with axial leads. The electrode 44a may be connected to axial lead 48, while the electrode 44b may be connected to axial lead 49. After the lead caps 48' and 49' are forced into place, the entire capacitor body may be provided with a suitable insulating coating 51 of varnish, or an epoxy or phenolic resin, as is known in the art. The insulation band is protected by this coating and the inside is sealed off where no insulating band exists. The insulating coating 51 also serves to help secure the leads in place. This outside coating is sufficient protection for the insulation band, and no under-coating operation is required.

The process of the invention is illustrated in the flow diagram of FIGURE 12 where it will be seen that the first step comprises immersing the blind hole ceramic member in a suitable plating bath. Thereafter, the surface of the plating bath is periodically subjected to vacuum and pressure conditions such any bubbles within or about the surface of the blind hole ceramic member may be eliminated. It has been found according to the invention that the use of alternating pressure, and preferably the steps of vacuumizing and pressurizing, will eliminate bubbles and provide a satisfactory coating 44 about all surfaces of the blind hole ceramic member. Thereafter, any area of the coating 44 may be ground away, such as the area 45, to separate the coating 44 into two distinct electrodes 44a and 44b.

As is shown in the final block of the flow diagram, the plating step may be followed by heating if the coating applied so requires. Otherwise, the heating step may be eliminated, and the grinding step may be followed in the usual manner by attachment of wire leads. The wire leads employed may be of the radial type, as shown in FIGURES 8 to 10, or the axial type as shown in FIGURE 12. An insulating coating may then be applied, if desired.

From the foregoing description it will be appreciated that the invention satisfies its objectives through the main novel features that the invention offers over the prior art. These include the use of a blind hole in the ceramic tube rather than a ceramic tube having a hole all the way through. Another is the use of alternate vacuum and atmospheric pressures above the plating bath to allow the plating solution to enter the cavity of the ceramic member without the hindrance of bubbles. Another important feature is in the step of grinding subsequent to plating.

Using the prior art method, four operations are required to deposit the metal onto the ceramic; these include the application of the inside electrode, bonding, application of outside electrode and bonding. Different methods are used for application of the silver, but in all cases this has to be done on an individual basis. With the method according to the invention, the electrodes are formed with two operations, metal deposition and grinding. In the case of depositing the metal, this is done on a bulk basis saving much time and money. The grinding operation is relatively simple, and quite obviously, easier than applying the outside electrode by a separate coating step according to the old method.

In the case of axial lead construction, the prior operation of protecting the inside insulation band is eliminated. Also, having one less insulation band over which a breakdown may occur increases the reliability of the finished capacitor according to the invention. As pointed out previously, the condition of the coating or the impregnant inside the cavity is not as critical in the new method as in the old method, since nothing exists inside the cavity except an electrode which is not exposed to any outside contacts.

It will be understood that the new capacitor produced according to the invention will have the same utility as presently known capacitors and condensers in various electrical circuits. However, the capacitor of the invention offers the advantage of lower cost in obtaining greater precision in capacity control.

Other advantages will be apparent to those skilled in the art. The invention should not be limited to the specific embodiments shown, and it will be appreciated that various modifications may be made in the invention described herein. The scope of the invention is defined in the following claims wherein:

What is claimed is:

1. The method of producing a capacitor which comprises the steps of
   immersing a blind hole ceramic member into a plating bath,
   periodically applying a vacuum above the surface of the plating solution to elimnate formation of bubbles,
   grinding away a portion of the plated material from the outside surface of the ceramic member, and then attaching wire leads in the usual manner.

2. The method of claim 1 wherein the ceramic member has a substantially cup-shaped configuration.

3. The method of claim 1 including the step of heating the plated material after the plating step.

4. The method of claim 1 including the step of applying a single insulating protecting coating over the completed capacitor.

5. The method of claim 1 wherein radial wire leads are attached.

6. The method of claim 1 wherein axial wire leads are attached.

7. In a process for producing a tubular shaped capacitor wherein an electrode coating is plated on a tubular ceramic member for providing two distinct electrodes to which wire leads are attached thereto, the improvement which comprises the steps of using a blind hole ceramic member and applying a continuous bubble free electrode coating over all exposed surfaces of the blind hole ceramic member, followed by grinding to remove a portion of the continuous electrode coating, thereby separating the continuous electrode coating into two separate and distinct portions to provide an insulating band between two distinct electrodes.

References Cited

UNITED STATES PATENTS

| | | | |
|---|---|---|---|
| 761,090 | 2/1904 | Moscicki | 317—242 |
| 893,811 | 7/1908 | Pickard | 317—242 X |
| 2,398,088 | 4/1946 | Ehlers | 317—242 X |
| 2,525,668 | 10/1950 | Gray | 317—242 X |

LEWIS H. MYERS, *Primary Examiner.*

ELLIOT GOLDBERG, *Assistant Examiner.*

U.S. Cl. X.R.

117—94, 212; 317—242